United States Patent [19]

Ushio et al.

[11] Patent Number: 4,670,614
[45] Date of Patent: Jun. 2, 1987

[54] HYDROCARBON CONVERSION PROCESS

[75] Inventors: Masaru Ushio, Yokohama; Takeshi Ishii; Hajime Okazaki, both of Kawasaki; Takashi Shoda; Kazuya Nasuno, both of Yokohama, all of Japan

[73] Assignee: Research Association for Petroleum Alternative Development, Tokyo, Japan

[21] Appl. No.: 744,250

[22] Filed: Jun. 13, 1985

[30] Foreign Application Priority Data

Jun. 15, 1984 [JP] Japan ................................ 59-121937
May 24, 1985 [JP] Japan ................................ 60-10189
Jun. 3, 1985 [JP] Japan ................................ 60-1118798

[51] Int. Cl.$^4$ ............................................. C07C 2/52
[52] U.S. Cl. ................................. 585/417; 208/135; 208/139; 585/418; 585/419; 585/420; 585/533
[58] Field of Search ............... 208/135, 139; 585/533, 585/417, 418, 419, 420

[56] References Cited

U.S. PATENT DOCUMENTS

| | | | |
|---|---|---|---|
| 4,297,335 | 10/1981 | Lok et al. | 423/328 C |
| 4,500,421 | 2/1985 | Chang et al. | 585/408 |
| 4,500,422 | 2/1985 | Miale et al. | 585/408 |
| 4,512,876 | 4/1985 | Miale et al. | 585/415 |
| 4,530,756 | 7/1985 | Chang et al. | 585/408 |
| 4,547,613 | 10/1985 | Garwood et al. | 585/533 |

Primary Examiner—Curtis R. Davis
Attorney, Agent, or Firm—Stevens, Davis, Miller & Mosher

[57] ABSTRACT

Provided is a process for producing gasoline having a high octane number or aromatic hydrocarbons by contacting a feed stock containing at least one aliphatic hydrocarbon having 1 to 12 carbon atoms with a catalyst at an elevated temperature said catalyst comprising a zeolite and a fluorine compound, and optionally Group Ib, IIb, IIIa, VI, VIIb or VIII metal in the Periodic Table.

16 Claims, No Drawings

HYDROCARBON CONVERSION PROCESS

BACKGROUND OF THE INVENTION

The present invention relates to a hydrocarbon conversion and more particularly to a process for producing gasolin having a high octane number and/or aromatic hydrocarbons by contacting a feed stock containing aliphatic hydrocarbon(s) of 1 to 12 carbon atoms with a zeolite catalyst at an elevated temperature.

In petroleum refineries, cracked gases comprising $C_1$ to $C_4$ paraffins and/or olefins are by-produced in large quantities from fluid catalytic cracking unit, thermal cracking unit or hydrocracking unit. These gases are usually consumed as fuel in those refineries or for domestic use. But, the development of use having an enhanced added value is desired.

Further, in producing ethylene and propylene by subjecting a petroleum distillate such as naphtha to a thermal cracking treatment in the presence of steam, a considerable amount of thermal-cracked gasoline is produced. Since this thermal-cracked gasoline contains a large amount of diolefins, it tends to polymerize during storage and form a large amount of gum, so it is desired to develop an effective method for removing the diolefins.

On the other hand, light straight-run naphtha from a distillation column is usually employed as a blend with gasoline, but a novel aromatization method has been desired because of a low octane number. Medium and heavy naphtha distillate from a distillation column is introduced into a reforming unit to produce reformed gasoline. But, the reformed gasoline contains large amounts of saturated aliphatic hydrocarbons, including those of $C_5$ and $C_6$, which are a cause of reduced octane number of products.

As a method for effectively utilizing $C_2$ to $C_5$ olefin gas contained in the above cracked gas, there is a polymer gasoline method or OTG reaction (Olefin-to-Gasoline), in which the said olefin gas is low-polymerized for conversion into gasoline. A solid acid is usually employed as catalyst, typical of which is a catalyst comprising diatomaceous earth or quartz sand and phosphoric acid adsorptively immobilized thereon. In this case, it is necessary that the operation for adsorptively immobilizing phosphoric acid should be done frequently because phosphoric acid is washed away quickly.

It is also known to use zeolite as catalyst. Especially, zeolites with pores each comprising a ten- or twelve-membered oxygen ring, such as ZSM-5, ZSM-11, mordenite, Y type zeolite and faujasite, exhibit after dealkalization a superior OTG reaction activity. For example, it is disclosed in Japanese Patent Laid Open No. 103292/1981 that aromatic hydrocarbons can be obtained in high yield by using as catalyst a zeolite having a high silica/alumina ratio such as ZSM-5 or ZSM-11. And it is disclosed in Japanese Patent Laid Open No. 24835/1979 that such zeolite catalyst is also effective for the aromatization of diolefins contained in thermal-cracked gasoline. Further, it is disclosed in Japanese Patent Publication No. 42639/1981 and Laid Open No. 93918/1982 that catalysts comprising such zeolites and various metals supported thereon permit conversion of not only unsaturated aliphatic hydrocarbons but also saturated aliphatic hydrocarbons into aromatic hydrocarbons.

However, in OTG reaction and aromatization using those zeolite catalysts, there occurs a rapid deterioration of catalytic activity caused by deposition of coke, so it is necessary to frequently perform the operation for catalyst regeneration by air calcination.

SUMMARY OF THE INVENTION

It is an object of the present invention to eliminate the above-mentioned drawbacks of the prior art.

It is another object of the present invention to provide a process for obtaining gasoline having a high octane number and/or aromatic hydrocarbons in high yield from a feed stock containing aliphatic hydrocarbons of 1 to 12 carbon atoms by the use of a catalyst having a long life and causing little deposition of coke.

The present invention resides in a process for producing reformed gasoline and/or aromatic hydrocarbons by contacting a feed stock containing at least one aliphatic hydrocarbon of 1 to 12 carbon atoms with a catalyst comprising zeolite and a fluorine compound at an elevated temperature.

DESCRIPTION OF THE PREFERRED EMBODIMENTS

The zeolite used in the present invention is a natural or synthetic zeolite having a crystal pore diameter of 3 to 9 Å and a silica/alumina mol ratio of 1 to 500, preferably 1 to 100. Examples are faujasite, gmelinite, zeolite L, mordenite, zeolite Ω, zeolite X, zeolite Y, ferrierite, ZSM-5, ZSM-11 and clinoptilolite. Particularly, ZSM-5, ZSM-11, mordenite, zeolite Y, faujasite and transition metal silicates are preferred.

The transition metal silicates indicate zeolites having an X-ray diffraction pattern similar to that of ZSM-5 or ZSM-11 and containing a transition metal as one constituent. Employed preferably are those containing one or more transition metals selected from Fe, Cr, V, Bi, Ti, B, Be and Ga.

The OTG or aromatization reaction partially involves an acid catalyst reaction. Therefore, in using the zeolite as catalyst in the process of the present invention, it is preferable that the alkali proportion in the zeolite be decreased in advance by dealkalization using an acid or an ammonium salt.

The dealkalizing ratio is preferably not less than 50 mol %, more preferably not less than 90 mol %, of the alkali metal or alkaline earth metal contained in the zeolite. As examples of a dealkalizing agent, mention may be made of mineral acids such as hydrochloric, sulfuric, nitric and phosphoric acids, water-soluble organic acids such as formic, acetic and malic acids, as well as ammonium ion-containing salts such as ammonium chloride and ammonium nitrate. Above all, hydrochloric acid, sulfuric acid, ammonium chloride and ammonium nitrate are preferred. These acids or salts may be used each alone or in combination and are used in the form of an aqueous solution. In this case, the acid concentration is preferably in the range of 1 to 30%, preferably 5 to 15%, although these concentrations differ according to treating conditions.

The treating temperature may be room temperature, but heating to 80°–100° C. is preferred in order to shorten the treating time. The treating time is preferably 5 hours to 3 days although it depends on temperature.

The fluorine compound used in the present invention is an inorganic compound comprising fluorine and a metal or a non-metallic element. Examples are aluminum fluoride, ammonium fluoride, magnesium fluoride, barium fluoride, zirconium fluoride, phosphorus fluoride, boron fluoride, zinc fluoride, gallium fluoride, cadmium fluoride, nickel fluoride, chromium fluoride, tin fluoride, copper fluoride, silver fluoride, rhenium fluoride, manganese fluoride, molybdenum fluoride, selenium fluoride, tellurium fluoride, tungsten fluoride, lanthanum fluoride, cerium fluoride, titanium fluoride and calcium fluoride. Organic compounds of fluorine are also employable such as, for example, Freon 11, Freon 12, Freon 14, Freon 114 and Freon C 318 (trade name, manufactured by Du Pont). Among these fluorine compounds, particularly preferred are aluminum fluoride, ammonium fluoride, magnesium fluoride, zirconium fluoride, phosphorus fluoride, boron fluoride and Freon 12.

Preferred examples of aluminum fluoride are hydrate aluminum trifluorides and basic aluminum fluorides, such as $\alpha$-AlF$_3$·3H$_2$O, $\beta$-AlF$_3$·3H$_2$O as well as aluminum fluorides obtained by calcining those hydrated aluminum fluorides at a temperature not higher than 700° C., preferably 200° to 500° C. Also effective are aluminum fluorides obtained by passing an excess amount of anhydrous hydrogen fluoride through a reaction tube charged with alumina, aluminum hydroxide or a mixture thereof at a temperature of 200° to 500° C., or passing an excess amount of anhydrous hydrogen fluoride through a reaction tube charged with aluminum chloride at a temperature of 20° to 400° C. In preparing these aluminum fluorides as a catalyst component used in the process of the present invention, a pure preparation thereof is not needed; in other words, a mixture thereof suffices.

Thus, the catalyst used in the present invention contains zeolite and the fluorine compounds as essential components. But, it is desirable for the aromatization that these components be combined with at least one metal selected from Group Ib, IIb, IIIa, VI, VIIb and VIII metals in the Periodic Table. Examples are Cu, Ag and Au as Group Ib metals, Zn and Cd as Group IIb metals, Al, Ga, In and Tl as Group IIIa metals, Cr, Mo, W, Se and Te as Group VI metals, Mn, Tc and Re as Group VIIb metals, and Fe, Co, Ni, Ru, Rh, Pd, Os, Ir and Pt as Group VIII metals. Particularly preferred are Cu, Ag, Zn, Cd, Ga, Cr, W, Se, Te, Re, Co, Ni, Pd, Ir and Pt.

The composition of the catalyst used in the process of the present invention is usually as follows although it differs according to reaction conditions: zeolite 20–99 wt. %, preferably 40–90 wt. % fluorine compound 1–80 wt. %, preferably 5–40 wt. %, metal (if used) 0.1–30 wt. %, preferably 1–20 wt. %.

The catalyst used in the process of the present invention can be prepared by any suitable method. The catalyst not containing the metallic element can be obtained by adding the fluorine compound to zeolite which has been dealkalized or not dealkalized, forming the resulting mixture into a suitable shape such as a powdered or granular (1–5 mm dia.) shape by, for example, compression molding, followed by calcining at 100°–700° C., preferably 300°–600° C., for 0.5 to 100 hours, preferably 1 to 8 hours.

On the other hand, the catalyst containing the metallic element can be obtained by adding the metallic element to zeolite which has been subjected or not subjected to dealkalization, in a conventional manner such as an ion exchange method or an impregnation method.

The metallic element is added to zeolite by first dissolving in a suitable solvent, e.g. water, in the form of a salt with mineral acid or organic acid, a chelate compound, a complex salt or an oxide and then contacting with the zeolite. In this case, the metal concentration is preferably in the range of 0.1 to 1.0 mol/l although it differs depending on the kind of metal and treating conditions.

The treating temperature may be room temperature in the case of an ion exchange method, but heating to 80°–100° C. is desirable to shorten the exchange time. Where the impregnation method is adopted, the treating temperature is preferably near the boiling point of the solvent. The treating time is preferably 30 minutes to 3 days although it depends on temperature.

The metallic element may be present as a metal oxide or a metal cation (in the case where the cation in the zeolite is replaced by the said metal cation) or as metal.

The zeolite thus mixed with the metallic element is then dried at a temperature usually in the range of 50° to 200° C., preferably 100° to 150° C., for 0.5 to 100 hours, preferably 1 to 8 hours, then mixed with the fluorine compound, then the mixture is formed into a suitable shape such as a powdered or granular (1–5 mm dia.) shape by, for example, compression molding, followed by calcining at 100°–700° C., preferably 300°–600° C., for 0.5 to 100 hours, preferably 1 to 8 hours. The addition of the metallic element to the zeolite may be done after the addition of the fluorine compound and calcination. The calcination usually is carried out in air. But, of course, it may be effected in an inert gas such as nitrogen or carbon dioxide, or hydrogen gas.

The feed stock used in the present invention contains as an essential component at least one aliphatic hydrocarbon having 1 to 12 carbon atoms. It may contain a mixture of such aliphatic hydrocarbons. Particularly, $C_2$ to $C_4$ aliphatic hydrocarbons or mixtures thereof are preferred. Light straight-run naphtha or reformed naphtha distillate or thermal-cracked gasoline contains a considerable amount of aliphatic hydrocarbons and is a desirable feed stock. The feed stock may contain aromatic hydrocarbons provided their content is usually not higher than 30% and not higher than 70% in the case of reformed naphtha.

The reaction in the present invention is carried out using the feed stock alone or in a gaseous atmosphere of, for example, nitrogen, steam, hydrogen or carbon dioxide. Preferably, it is effected in a hydrogen gas atmosphere. Hydrogen is effective mainly for reducing the amount of carbonaceous material deposited.

The amount of hydrogen to be added relative to the starting hydrocarbon is not specially limited, but not greater than 1:50 as the starting hydrocarbon:hydrogen mol ratio is sufficient, and preferably in the range of 1:1 to 1:5. Part of the hydrogen produced by the reaction is also employable for this purpose.

The reaction pressure is preferably in the range of 1 to 100 atm, more preferably 5 to 20 atm, and the reaction temperature is preferably in the range of 250° to 700° C., more preferably 400° to 600° C.

The starting gas feed rate per unit weight of the catalyst, WHSV (g-feed gas/g-cat.hr), is not specially limited, but in order to attain a high conversion, it is preferably not higher than 10, more preferably in the range of 0.5 to 2.0.

The reaction may be performed using a known method such as a fixed bed or a fluidized bed, for example.

[Effect of the Invention]

The catalyst used in the present invention has a long life and causes little deposition of coke. By using such catalyst, aromatic hydrocarbons can be obtained in high yield. Consequently, it is possible to obtain gasoline of a high octane number from the inexpensive feed stock.

The following examples are given to further illustrate the present invention.

EXAMPLE 1

Sodium form of ZSM-5 was calcined at 500° C. for 5 hours, then treated with 2N hydrochloric acid at 90°–100° C. for 5 hours, then washed with water thoroughly and thereafter dried at 120° C. for 5 hours to obtain a dealkalized ZSM-5 (catalyst 1).

20 wt. % of aluminum trifluoride was added and mixed to the above acid-treated catalyst 1, then the mixture was compression-molded into 3×4 mm dia. pellets, which were then calcined at 500° C. for 8 hours (catalyst 2).

Using 2.0 g. of each catalyst thus obtained, a life test of OTG reaction was made at 300° C., a hydrogen flow rate of 4.2 l/hr, a feed gas flow rate of 2.0 g/hr, hence a hydrogen to feed gas mol ratio of 3.0, WHSV of 1 hr$^{-1}$, at atmospheric pressure. As used herein, $C_3'$ designates a $C_3$ olefin and $C_4'$ designates a $C_4$ olefin. Results are as set out in Table 1 below.

TABLE 1

| Catalyst | | Feed Gas | Catalyst 1 (Comp. Ex.) | | Catalyst 2 (Example) | |
|---|---|---|---|---|---|---|
| Run Time (hr) | | | 7.0 | 215.0 | 7.0 | 220.0 |
| $C_3^- + C_4^-$ Conversion (%) | | | 95.2 | 72.0 | 76.6 | 74.3 |
| Distribution | $C_1$-$C_2$ | — | 2.5 | 1.8 | 2.8 | 2.5 |
| of Resulting | $C_3$ | 3.1 | 36.5 | 7.1 | 8.7 | 8.5 |
| Hydrocarbons | $C_3^-$ | 1.4 | 1.2 | 6.1 | 5.2 | 5.4 |
| (wt. %) | $C_4$ | 57.1 | 34.4 | 59.6 | 54.4 | 53.8 |
| | $C_4^-$ | 38.3 | 0.7 | 5.0 | 4.1 | 4.8 |
| | $C_5^+$ Aliphatics | 0.1 | 4.3 | 12.2 | 10.7 | 11.7 |
| | Aromatics | — | 20.4 | 8.2 | 14.1 | 13.3 |
| | Total | 100.0 | 100.0 | 100.0 | 100.0 | 100.0 |
| $C_5^+$ Gasoline* (wt. %) | | | 24.7 | 20.4 | 24.8 | 25.0 |

*$C_5^+$ aliphatics + aromatics

The $C_3'+C_4'$ conversion and the distribution of the resulting hydrocarbons, just after the run (after 7 hours), are here compared between catalyst 1 and 2. The $C_3'+C_4'$ conversion in the use of catalyst 1 is 95%, while it is as low as 77% in the use of catalyst 2. Catalyst 1 is much higher in initial activity.

However, the $C_5^+$ gasoline yield in the use of catalyst 1 and that in the use of catalyst 2 both are about 25 wt. % and thus almost equal to each other. Therefore, catalyst 2 is superior in the selectivity to gasoline.

Now, a comparison is here made between both catalysts with respect to activity and selectivity after the lapse of about 200 hours. The activity of catalyst 1 lowers gradually, and the $C_3' + C_4$ conversion after 215 hours is as low as 72%. On the other hand, the activity of catalyst 2 changes little, and the $C_3'+C_4'$ conversion after 220 hours is 74.3%. Also as to $C_5^+$ gasoline yield, it lowers to about 20% in the use of catalyst 1, while a high value of 25% is held in the use of catalyst 2.

From the above it is seen that catalyst 2 has a long life and exhibits a superior selectivity to $C_5^+$ gasoline.

EXAMPLE 2

Sodium form of a synthetic mordenite was calcined at 500° C. for 5 hours, then treated with 2N hydrochloric acid at 90°–100° C. for 5 hours, then washed with water thoroughly and thereafter dried at 120° C. for 5 hours to obtain a dealkalized mordenite (catalyst 3).

20 wt. % of aluminum trifluoride was added and mixed to the above acid-treated catalyst 3, then the mixture was formed into 3×4 mm dia. pellets, which were then calcined at 500° C. for 8 hours (catalyst 4).

Using 2.0 g. of each catalyst thus obtained, a life test of OTG reaction was made under the same reaction conditions as in Example 1. Results are as set out in Table 2 below.

TABLE 2

| Catalyst | | Feed Gas | Catalyst 3 (Comp. Ex.) | | Catalyst 4 (Example) | |
|---|---|---|---|---|---|---|
| Run Time (hr) | | | 1.0 | 5.0 | 1.0 | 100.0 |
| $C_3^- + C_4^-$ Conversion (%) | | | 89.4 | 53.0 | 72.3 | 71.5 |
| Distribution | $C_1$-$C_2$ | — | 4.9 | 3.5 | 3.9 | 3.7 |
| of Resulting | $C_3$ | 3.1 | 37.4 | 5.3 | 17.3 | 16.8 |
| Hydrocarbons | $C_3^-$ | 1.4 | 2.7 | 9.8 | 6.2 | 6.0 |
| (wt. %) | $C_4$ | 57.1 | 36.2 | 58.5 | 48.8 | 48.4 |
| | $C_4^-$ | 38.3 | 1.5 | 8.9 | 4.8 | 5.3 |
| | $C_5^+$ Aliphatics | 0.1 | 3.0 | 8.4 | 12.4 | 13.5 |
| | Aromatics | — | 14.3 | 5.6 | 6.6 | 6.3 |
| | Total | 100.0 | 100.0 | 100.0 | 100.0 | 100.0 |
| $C_5^+$ Gasoline* (wt. %) | | | 17.3 | 14.0 | 19.0 | 19.8 |

*$C_5^+$ aliphatics + aromatics

From the above results it is seen that the catalyst 4 treated with aluminum trifluoride has a high selectivity to $C_5^+$ gasoline and a long life as compared with untreated catalyst 3.

EXAMPLE 3

Sodium form of Y type zeolite was calcined at 500° C. for 5 hours, then treated with 2N hydrochloric acid at 90°–100° C. for 5 hours, then washed with water thoroughly and thereafter dried at 120° C. for 5 hours to obtain a dealkalized Y type zeolite (catalyst 5).

20 wt. % of aluminum trifluoride was added and mixed to the above acid-treated catalyst 5 and the mixture was formed into 3×4 mm dia. pellets, which were then calcined at 500° C. for 8 hours (catalyst 6).

Using 2.0 g. of each catalyst thus obtained, a life test of OTG reaction was made under the same conditions as in Example 1. Results are as set forth in Table 3 below.

TABLE 3

| Catalyst | | Feed Gas | Catalyst 5 (Comp. Ex.) | | Catalyst 6 (Example) | |
|---|---|---|---|---|---|---|
| Run Time (hr) | | | 2.0 | 4.0 | 2.0 | 120.0 |
| $C_3^- + C_4^-$ Conversion (%) | | | 85.1 | 66.0 | 69.3 | 68.8 |
| Distribution | $C_1$-$C_2$ | — | 4.5 | 3.6 | 3.5 | 3.3 |
| of Resulting | $C_3$ | 3.1 | 31.3 | 15.4 | 16.6 | 15.9 |
| Hydrocarbons | $C_3^-$ | 1.4 | 3.5 | 7.0 | 6.9 | 6.9 |
| (wt. %) | $C_4$ | 57.1 | 40.8 | 53.2 | 46.0 | 46.1 |
| | $C_4^-$ | 38.3 | 2.4 | 6.5 | 5.3 | 5.5 |
| | $C_5^+$ Aliphatics | 0.1 | 3.5 | 8.1 | 14.5 | 15.3 |
| | Aromatics | — | 14.0 | 6.2 | 7.2 | 7.0 |
| | Total | 100.0 | 100.0 | 100.0 | 100.0 | 100.0 |
| $C_5^+$ Gasoline* (wt. %) | | | 17.5 | 14.3 | 21.7 | 22.3 |

*$C_5^+$ aliphatics + aromatics

From the above results it is seen that the catalyst 6 treated with aluminum trifluoride has a high selectivity to $C_5^+$ gasoline and a long life as compared with untreated catalyst 5.

EXAMPLE 4

Sodium form of ZSM-5 having an $SiO_2/Al_2O_3$ ratio of 80 was calcined at 500° C. for 5 hours, then treated with 2N hydrochloric acid at 90°-100° C. for 5 hours, then washed with water thoroughly and thereafter dried at 120° C. for 5 hours to obtain a dealkalized ZSM-5 (catalyst 7). Then, the zeolite was immersed in 3 mol/l of an aqueous $ZnCl_2$ solution, evaporated to dryness and calcined at 120° C. for 5 hours and further at 500° C. for 8 hours to obtain a dealkalized 5 wt. % Zn-supported ZSM-5 (catalyst 8).

On the other hand, 10 wt. % of zinc fluoride was added and mixed to the catalyst 7 and the resultant mixture was formed into 3×4 mm dia. pellets, by compression molding, which were then calcined at 500° C. for 8 hours (catalyst 9).

Using 2.0 g. of each of the catalysts 8 and 9 thus obtained, activity and life were evaluated under the conditions of temperature 520° C., hydrogen flow rate 4.2 l/hr, feed butane-butene gas flow rate 2.0 g/hr, hence hydrogen to feed gas mol ratio 3.0, WHSV=1 $hr^{-1}$, at atmospheric pressure. Results are as set forth in Table 4 below.

TABLE 4

| Catalyst | | Feed Gas | Catalyst 8 (Comp. Ex.) | | Catalyst 9 (Example) | |
|---|---|---|---|---|---|---|
| Run Time (hr) | | | 5.0 | 200.0 | 5.0 | 200.0 |
| $C_4 + C_4^-$ Conversion (%) | | | 79.5 | 37.9 | 73.8 | 60.0 |
| Distribution | $C_1$-$C_2$ | — | 18.4 | 5.9 | 15.3 | 10.5 |
| of Resulting | $C_3$ | 3.1 | 15.9 | 3.2 | 9.1 | 8.8 |
| Hydrocarbons | $C_3^-$ | 1.4 | 3.2 | 15.8 | 5.1 | 7.6 |
| (wt. %) | $C_4$ | 57.1 | 16.6 | 48.3 | 21.2 | 33.5 |
| | $C_4^-$ | 38.3 | 3.0 | 11.0 | 3.8 | 4.7 |
| | $C_5^+$ Aliphatics | 0.1 | 0.6 | 5.6 | 1.2 | 3.0 |
| | Aromatics | 0.0 | 42.4 | 10.7 | 44.1 | 32.0 |
| | Total | 100.0 | 100.0 | 100.0 | 100.0 | 100.0 |
| $C_5^+$ Gasoline* (wt. %) | | 0.1 | 43.0 | 16.3 | 45.3 | 35.0 |

*$C_5^+$ aliphatics + aromatics

From the above results it is seen that the catalyst 9 treated with zinc fluoride affords high $C_5^+$ gasoline yield and aromatics yield and has a long life as compared with the catalyst 8 impregnated with zinc.

EXAMPLE 5

Sodium form of ZSM-5 having an $SiO_2/Al_2O_3$ ratio of 28 was calcined at 500° C. for 5 hours, then treated with 2N hydrochloric acid at 90°-100° C. for 5 hours, then washed with water thoroughly and thereafter dried at 120° C. for 5 hours to obtain a dealkalized ZSM-5 (catalyst 10).

Then catalyst 10 was immersed in 2 mol/l of an aqueous $GaCl_3$ solution, evaporated to dryness and calcined at 120° C. for 5 hours and further at 500° C. for 8 hours to obtain a dealkalized 4 wt. % Ga-supported ZSM-5 (catalyst 11).

On the other hand, 10 wt. % of gallium trifluoride was added and mixed to catalyst 10 and the resultant mixture was compression-molded into 3×4 mm dia. pellets, which were calcined at 500° C. for 8 hours (catalyst 12).

Using 2.0 g. of each of the thus-obtained catalysts 11 and 12, activity and life were evaluated under the conditions of temperature 550° C., hydrogen flow rate 4.2 l/hr, feed B-B' gas flow rate 2.0 g/hr, hence hydrogen to feed gas mol ratio 3.0, WHSV=1 $hr^{-1}$, at atmospheric pressure. Results are as set forth in Table 5 below.

TABLE 5

| Catalyst | | Feed Gas | Catalyst 11 (Comp. Ex.) | | Catalyst 12 (Example) | |
|---|---|---|---|---|---|---|
| Run Time (hr) | | | 5.0 | 200.0 | 5.0 | 200.0 |
| $C_4 + C_4^-$ Conversion (%) | | | 87.4 | 36.0 | 81.2 | 57.0 |
| Distribution | $C_1$-$C_2$ | — | 19.1 | 8.0 | 15.9 | 12.1 |
| of Resulting | $C_3$ | 3.1 | 16.6 | 6.9 | 13.6 | 10.5 |
| Hydrocarbons | $C_3^-$ | 1.4 | 3.1 | 1.4 | 2.9 | 2.1 |
| (wt. %) | $C_4$ | 57.1 | 10.3 | 49.8 | 15.2 | 35.8 |
| | $C_4^-$ | 38.3 | 1.8 | 11.3 | 2.7 | 5.2 |
| | $C_5^+$ Aliphatics | 0.1 | 0.5 | 0.2 | 0.5 | 0.4 |
| | Aromatics | 0.0 | 48.6 | 22.4 | 49.3 | 34.0 |
| | Total | 100.0 | 100.0 | 100.0 | 100.0 | 100.0 |
| $C_5^+$ Gasoline* (wt. %) | | 0.1 | 49.1 | 22.6 | 49.8 | 34.4 |

*$C_5^+$ aliphatics + aromatics

From the above results it is seen that the catalyst 12 treated with gallium trifluoride affords high $C_5^+$ gasoline yield and aromatics yield and has a long life as compared with the catalyst 11 impregnated with gallium.

EXAMPLE 6

Sodium form of ZSM-5 having an $SiO_2/Al_2O_3$ ratio of 48 was calcined at 500° C. for 5 hours, then treated with 2N hydrochloric acid at 90°-100° C. for 5 hours, then washed with water thoroughly and thereafter dried at 120° C. for 5 hours to obtain a dealkalized ZSM-5 (catalyst 13).

The catalyst 13 was immersed in 3 mol/l of an aqueous $CdCl_2$ solution, evaporated to dryness and then calcined at 120° C. for 5 hours and further at 500° C. for 8 hours to obtain a dealkalized 3 wt. % Cd-supported ZSM-5 (catalyst 14).

On the other hand, 4 wt. % of cadmium fluoride was added and mixed to catalyst 13 and the resultant mixture was compression-molded into 3×4 mm dia. pellets, which were calcined at 500° C. for 8 hours (catalyst 15).

Using 2.0 g. of each of the catalysts 14 and 15 thus obtained, activity and life were evaluated under the conditions of temperature 550° C., hydrogen flow rate 4.2 l/hr, feed butane gas flow rate 2.0 g/hr, hence hydrogen to feed gas mol ratio 3.0, WHSV=1 $hr^{-1}$ at atmospheric pressure. Results are as set forth in Table 6 below.

TABLE 6

| Catalyst | | Feed Butane | Catalyst 14 (Comp. Ex.) | | Catalyst 15 (Example) | |
|---|---|---|---|---|---|---|
| Run Time (hr) | | | 5.0 | 70.0 | 5.0 | 70.0 |
| Conversion (%) | | 26.0 | 45.2 | 20.3 | 43.9 | 35.7 |
| Distribution | $C_1$-$C_2$ | — | 13.1 | 5.0 | 10.4 | 5.5 |
| of Resulting | $C_3$ | — | 7.8 | 3.0 | 6.6 | 6.1 |
| Hydrocarbons | $C_4$ | 100.0 | 54.8 | 79.7 | 56.1 | 64.3 |
| (wt. %) | $C_5^+$ Aliphatics | — | 0.3 | 0.2 | 0.4 | 0.7 |
| | Aromatics | — | 24.1 | 12.1 | 26.4 | 23.4 |
| | Total | 100.0 | 100.0 | 100.0 | 100.0 | 100.0 |
| $C_5^+$ Gasoline* (wt. %) | | | 24.4 | 12.3 | 26.8 | 24.1 |

*$C_5^+$ aliphatics + aromatics

Reference to the above results shows that the catalyst 15 treated with cadmium fluoride affords high $C_5^+$ gasoline yield and aromatics yield and has a long life as compared with the catalyst impregnated with cadmium.

EXAMPLE 7

Using the same catalysts 8 and 9 as in Example 4, catalyst activity and life in an aromatization reaction of n-hexane were evaluated under the conditions of temperature 480° C., hydrogen flow rate 3.6 l/hr, feed rate 2.0 g/hr, WHSV=1 hr$^{-1}$, at atmospheric pressure. Results are as set forth in Table 7 below.

temperature 450° C., hydrogen flow rate of 4.2 l/hr, starting propylene gas feed rate 2.0 g/hr, hence hydrogen to feed gas mol ratio ≈4, WHSV=1 hr$^{-1}$, at atmospheric pressure. Results are as set forth in Table 8.

Reference to Table 8 shows that the catalysts 23, 24, 25, 26, 27 and 28 which have been heat-treated after support off the metal fluorides afford high aromatics yields and have a long life.

TABLE 8

| Catalyst | | 17 | | 18 | | 19 | | 20 | | 21 | | 22 | |
|---|---|---|---|---|---|---|---|---|---|---|---|---|---|
| Support Metal | | Ag | | Cr | | Se | | Re | | Ni | | Sn | |
| Run Time (hr) | | 10.0 | 200.0 | 10.0 | 200.0 | 10.0 | 200.0 | 10.0 | 200.0 | 10.0 | 200.0 | 10.0 | 200.0 |
| Conversion (%) | | 93.7 | 58.1 | 91.5 | 56.2 | 94.4 | 59.6 | 93.8 | 57.9 | 94.9 | 5917 | 92.6 | 57.3 |
| Distribution | $C_5^+$ | 44.4 | 23.0 | 43.5 | 22.9 | 8.4 | 10.2 | 45.2 | 23.7 | 50.0 | 26.9 | 46.2 | 23.6 |
| of Resulting | Aliphatics | | | | | | | | | | | | |
| Hydrocarbons | Aromatics | 13.4 | 6.1 | 12.3 | 5.5 | 40.1 | 14.5 | 13.9 | 5.9 | 12.3 | 5.8 | 12.5 | 5.3 |
| (wt. %) | | | | | | | | | | | | | |
| $C_5^+$ Gasoline* (wt. %) | | 57.8 | 29.1 | 55.8 | 28.4 | 48.5 | 24.7 | 59.1 | 29.6 | 62.3 | 32.7 | 58.7 | 28.9 |
| Catalyst | | 23 | | 24 | | 25 | | 26 | | 27 | | 28 | |
| Support Metal | | AgF | | CrF$_3$ | | SeOF$_2$ | | ReF$_6$ | | NiF$_2$ | | SnF$_2$ | |
| Run Time (hr) | | 10.0 | 200.0 | 10.0 | 200.0 | 10.0 | 200.0 | 10.0 | 200.0 | 10.0 | 200.0 | 10.0 | 200.0 |
| Conversion (%) | | 89.3 | 69.7 | 87.6 | 68.7 | 89.1 | 70.5 | 89.7 | 69.6 | 90.5 | 70.6 | 90.1 | 70.2 |
| Distribution | $C_{5+}$ | 43.0 | 32.5 | 42.1 | 32.2 | 7.0 | 7.3 | 44.0 | 34.2 | 49.5 | 39.8 | 44.6 | 33.3 |
| of Resulting | Aliphatics | | | | | | | | | | | | |
| Hydrocarbons | Aromatics | 15.9 | 11.6 | 15.0 | 10.9 | 44.3 | 37.7 | 15.5 | 11.3 | 15.2 | 11.0 | 14.7 | 10.5 |
| (wt. %) | | | | | | | | | | | | | |
| $C_5^+$ Gasoline* (wt. %) | | 58.9 | 44.1 | 57.1 | 43.1 | 51.3 | 45.0 | 59.5 | 45.5 | 64.7 | 50.8 | 59.3 | 43.8 |

*$C_5^+$ aliphatics + aromatics

TABLE 7

| Catalyst | | Feed n-C$_6$ | Catalyst 8 (Comp. Ex.) | | Catalyst 9 (Example) | |
|---|---|---|---|---|---|---|
| Run Time (hr) | | | 20.0 | 250.0 | 20.0 | 250.0 |
| Conversion (%) | | | 95.0 | 65.0 | 87.7 | 71.3 |
| Distribution | C$_1$-C$_2$ | | 24.7 | 3.6 | 12.2 | 9.2 |
| of Resulting | C$_3$ | | 24.3 | 10.2 | 15.6 | 11.9 |
| Hydrocarbons | C$_4$ | | 2.5 | 9.2 | 7.2 | 5.3 |
| (wt. %) | $C_5^+$ | 100.0 | 6.5 | 58.2 | 25.4 | 41.0 |
| | Aliphatics | | | | | |
| | Aromatics | | 42.0 | 18.9 | 43.5 | 32.7 |
| | Total | 100.0 | 100.0 | 100.0 | 100.0 | 100.0 |
| $C_5^+$ Gasoline* (wt. %) | | | 48.5 | 76.9 | 68.9 | 73.7 |

*$C_5^+$ aliphatics + aromatics

Reference to the above results shows that the catalyst 9 treated with zinc fluoride affords a high aromatics yield and has a long life as compared with the zinc-impregnated catalyst 8.

EXAMPLE 8

A transition metal silicate having an SiO$_2$/Al$_2$O$_3$ mol ratio of 50 and containing 0.3 wt. % of Fe$_2$O$_3$ was subjected to a hydrothermal synthesis, calcined at 550° C. for 5 hours, then treated with 1N hydrochloric acid at 90°-100° C. for 5 hours, then washed with water thoroughly and thereafter dried at 120° C. for 5 hours to obtain a dealkalized, iron-containing transition metal silicate (catalyst 16) having a ZSM-5 type crystal structure.

Then, the catalyst 16 was impregnated with each of 3 wt. % Ag, Cr, Se, Re, Ni and Sn by an impregnation method to obtain catalysts 17, 18, 19, 20, 21 and 22.

On the other hand, 4 wt. % AgF, 6 wt. % CrF$_3$, 5 wt. % SeOF$_2$, 5 wt. % ReF$_6$, 5 wt. % NiF$_2$ and 4 wt. % SnF$_2$ were each added and mixed to the catalyst 16, and the resultant mixtures were compression-milded into 3×4 mm dia. pellets, which were then calcined at 500° C. for 8 hours to obtain catalysts 23, 24, 25, 26, 27 and 28.

Using 2.0 g. of each of the twelve catalysts thus obtained, a life test was made under the conditions of

EXAMPLE 9

Sodium form of ZSM-5 having an SiO$_2$/Al$_2$O$_3$ ratio of 78 was calcined at 500° C. for 5 hours, then treated with 2N hydrochloric acid at 90°-100° C. for 5 hours, then washed with water thoroughly and thereafter dried at 120° C. for 5 hours to obtain a dealkalized ZSM-5. Then, the zeolite was immersed in 3 mol/l of an aqueous ZnCl$_2$ solution at 70° C. for 1 hour to obtain a dealkalized 2 wt. % Zn-supported ZSM-5 (catalyst 29).

Then, 20 wt. % of aluminum fluoride was added and mixed to the catalyst 29 and the resultant mixture was formed into 3×4 mm dia. pellets, by compression molding, which were then calcined at 500° C. for 8 hours (catalyst 30).

Using 2.0 g. of each of the catalysts thus obtained, life was evaluated under the conditions of temperature 300° C., hydrogen flow rate 2.0 l/hr, feed butane-butene gas flow rate 2.0 g/hr, hence hydrogen to feed gas mol ratio 5, WHSV=1 hr$^{-1}$, at atmospheric pressure. Results are as set forth in Table 9 below.

TABLE 9

| Catalyst | | Feed Gas | Catalyst 29 (Comp. Ex.) | | Catalyst 30 (Example) | |
|---|---|---|---|---|---|---|
| Run Time (hr) | | | 10.0 | 250.0 | 10.0 | 250.0 |
| C$_4$ + C$_4^-$ Conversion (%) | | | 83.7 | 39.9 | 77.7 | 63.2 |
| Distribution | C$_1$-C$_2$ | — | 19.2 | 6.1 | 16.1 | 11.0 |
| of Resulting | C$_3$ | 3.1 | 16.6 | 3.3 | 9.6 | 9.2 |
| Hydrocarbons | C$_3^-$ | 1.4 | 3.3 | 16.4 | 5.4 | 8.0 |
| (wt. %) | C$_4$ | 57.1 | 13.5 | 46.7 | 18.1 | 30.8 |
| | C$_4^-$ | 38.3 | 2.4 | 10.6 | 3.2 | 4.3 |
| | $C_5^+$ | 0.1 | 0.6 | 5.8 | 1.3 | 3.1 |
| | Aliphatics | | | | | |
| | Aromatics | — | 44.4 | 11.1 | 46.3 | 33.6 |
| | Total | 100.0 | 100.0 | 100.0 | 100.0 | 100.0 |
| $C_5^+$ Gasoline* (wt. %) | | 0.1 | 45.0 | 16.9 | 47.6 | 36.7 |

*$C_5^+$ aliphatics + aromatics

From the above results it is seen that the catalyst 30 treated with aluminum fluoride affords high $C_5^+$ gasoline yield and aromatics yield and has a long life.

EXAMPLE 10

Sodium form of ZSM-5 having an $SiO_2/Al_2O_3$ ratio of 30 was calcined at 500° C. for 5 hours, then treated with 2N hydrochloric acid at 90°–100° C. for 5 hours, then washed with water thoroughly and thereafter dried at 120° C. for 5 hours to obtain a dealkalized ZSM-5.

The dealkalized ZSM-5 was immersed in 2 mol/l of an aqueous $GaCl_3$ solution, at 70° C. for 1 hour to obtain a dealkalized 2 wt. % Ga-supported ZSM-5 (catalyst 31).

Then, 20 wt. % of aluminum trifluoride was added and mixed to the above catalyst 31 and the resultant mixture was compression-molded into 3×4 mm dia. pellets, which were calcined at 500° C. for 8 hours (catalyst 32).

Using 2.0 g. of each of the thus-obtained catalysts, life was evaluated under the conditions of temperature 550° C., hydrogen flow rate 4.2 l/hr, feed butane-butene gas flow rate 2.0 g/hr, hence hydrogen to feed gas mol ratio 5.0, WHSV=1 hr$^{-1}$, at atmospheric pressure. Results are as set forth in Table 10 below.

TABLE 10

| Catalyst | | Feed Gas | Catalyst 31 (Comp. Ex.) | | Catalyst 32 (Example) | |
|---|---|---|---|---|---|---|
| Run Time (hr) | | | 10.0 | 250.0 | 10.0 | 250.0 |
| $C_4 + C_4^-$ Conversion (%) | | | 92.1 | 37.9 | 85.5 | 60.0 |
| Distribution | $C_1-C_2$ | 0.0 | 20.0 | 8.4 | 16.7 | 12.7 |
| of Resulting | $C_3$ | 3.1 | 17.4 | 7.2 | 14.3 | 11.0 |
| Hydrocarbons | $C_3^-$ | 1.4 | 3.3 | 1.5 | 3.1 | 2.0 |
| (wt. %) | $C_4$ | 57.1 | 6.4 | 48.7 | 10.3 | 33.4 |
| | $C_4^-$ | 38.3 | 1.1 | 10.5 | 2.5 | 4.7 |
| | $C_5^+$ Aliphatics | 0.1 | 0.5 | 0.2 | 0.5 | 0.4 |
| | Aromatics | 0.0 | 51.3 | 23.5 | 52.7 | 35.7 |
| | Total | 100.0 | 100.0 | 100.0 | 100.0 | 100.0 |
| $C_5^+$ Gasoline* (wt. %) | | 0.1 | 51.8 | 23.7 | 53.2 | 36.1 |

*$C_5^+$ aliphatics + aromatics

From the above results it is seen that the catalyst 32 treated with aluminum trifluoride affords high $C_5^+$ gasoline yield and aromatics yield and has a long life.

EXAMPLE 11

Sodium form of ZSM-5 having an $SiO_2/Al_2O_3$ ratio of 50 was calcined at 500° C. for 5 hours, then treated with 2N hydrochloric acid at 90°–100° C. for 5 hours, then washed with water thoroughly and thereafter dried at 120° C. for 5 hours to obtain a dealkalized ZSM-5.

The dealkalized ZSM-5 was immersed in 3 mol/l of an aqueous $CdCl_2$ solution, at 70° C. for 1 hour to obtain a dealkalized 3 wt. % Cd-supported ZSM-5 (catalyst 33).

Then, 20 wt. % of ammonium fluoride was added and mixed to catalyst 33 and the resultant mixture was compression-molded into 3×4 mm dia. pellets, which were then calcined at 500° C. for 8 hours (catalyst 34).

Using 2.0 g. of each of the catalysts thus obtained, life was evaluated under the conditions of temperature 600° C., hydrogen flow rate 4.2 l/hr, feed butane gas flow rate 2.0 g/hr, hence hydrogen to feed gas mol ratio 5, WHSV=1 hr$^{-1}$, at atmospheric pressure. Results are as set forth in Table 11 below.

TABLE 11

| Catalyst | | Feed Butane | Catalyst 33 (Comp. Ex.) | | Catalyst 34 (Example) | |
|---|---|---|---|---|---|---|
| Run Time (hr) | | | 1.0 | 50.0 | 1.0 | 50.0 |
| Conversion (%) | | | 50.2 | 22.6 | 48.8 | 39.7 |
| Distribution | $C_1-C_2$ | | 14.8 | 5.6 | 11.6 | 6.1 |
| of Resulting | $C_3$ | | 8.8 | 3.3 | 7.3 | 6.8 |
| Hydrocarbons | $C_4$ | 100.0 | 48.8 | 77.4 | 51.2 | 60.3 |
| (wt. %) | $C_5^+$ Aliphatics | | 0.3 | 0.2 | 0.5 | 0.8 |
| | Aromatics | | 27.3 | 13.5 | 29.4 | 26.0 |
| | Total | 100.0 | 100.0 | 100.0 | 100.0 | 100.0 |
| $C_5^+$ Gasoline* (wt. %) | | | 27.6 | 13.7 | 29.9 | 26.8 |

*$C_5^+$ aliphatics + aromatics

Reference to the above results shows that the catalyst 34 treated with ammonium fluoride affords high $C_5^+$ gasoline yield and aromatics yield and has a long life.

EXAMPLE 12

Using the same catalysts 29 and 30 as in Example 9, catalyst life in an aromatization reaction of n-hexane was evaluated under the conditions of temperature 500° C., hydrogen flow rate 3.6 l/hr, feed rate 2.0 g/hr, WHSV=1 hr$^{-1}$, at atmospheric pressure. Results are as set forth in Table 12 below.

TABLE 12

| Catalyst | | Feed n-$C_6$ | Catalyst 29 (Comp. Ex.) | | Catalyst 30 (Example) | |
|---|---|---|---|---|---|---|
| Run Time (hr) | | | 10.0 | 200.0 | 10.0 | 200.0 |
| Conversion (%) | | | 100.0 | 68.4 | 92.3 | 75.1 |
| Distribution | $C_1-C_2$ | | 24.1 | 4.1 | 12.1 | 9.8 |
| of Resulting | $C_3$ | | 23.7 | 11.5 | 15.6 | 12.6 |
| Hydrocarbons | $C_4$ | | 2.6 | 10.4 | 6.9 | 5.6 |
| (wt. %) | $C_5^+$ Aliphatics | 100.0 | 0.8 | 52.7 | 23.1 | 37.3 |
| | Aromatics | | 48.8 | 21.3 | 42.3 | 34.7 |
| | Total | 100.0 | 100.0 | 100.0 | 100.0 | 100.0 |
| $C_5^+$ Gasoline* (wt. %) | | | 49.6 | 74.0 | 65.4 | 72.0 |

*$C_5^+$ aliphatics + aromatics

Reference to the above results shows that the catalyst 30 treated with aluminum fluoride has a long life.

EXAMPLE 13

A transition metal silicate having an $SiO_2/Al_2O_3$ mol ratio of 90 and containing 0.5 wt. % of $Fe_2O_3$ was subjected to a hydrothermal synthesis, calcined at 500° C. for 5 hours, then treated with 1N hydrochloric acid at 90°–100° C. for 5 hours, then washed with water thoroughly and thereafter dried at 120° C. for 5 hours to obtain a dealkalized, iron-containing transition metal silicate having a ZSM-5 type crystal structure.

Then, the silicate was impregnated with each of 3 wt. % Cu, Cr, Te, Re and Ni by an impregnation method to obtain catalysts 35, 36, 37, 38 and 39.

Then, 20 wt. % Aluminum trifluoride was added and mixed to each of the five catalysts, and the resultant mixtures were compression-molded into 3×4 mm dia. pellets, which were then calcined at 500° C. for 8 hours to obtain catalysts 40, 41, 42, 43 and 44.

Using 2.0 g. of each of the ten catalysts thus obtained, a life test was made under the conditions of temperature 480° C., hydrogen flow rate of 4.2 l/hr, starting propylene gas feed rate 2.0 g/hr, hence hydrogen to feed gas mol ratio ≈4, WHSV=1 hr$^{-1}$, at atmospheric pressure. Results are as set forth in Table 13.

TABLE 13

| Catalyst | 35 | 36 | 37 | 38 | 39 |
|---|---|---|---|---|---|

TABLE 13-continued

| Support Metal | | Cu | | Cr | | Te | | Re | | Ni | |
|---|---|---|---|---|---|---|---|---|---|---|---|
| AlF₃ treatment | | none | | none | | none | | none | | none | |
| Run Time (hr) | | 5.0 | 150.0 | 5.0 | 150.0 | 5.0 | 150.0 | 5.0 | 150.0 | 5.0 | 150.0 |
| Conversion (%) | | 94.3 | 59.5 | 92.5 | 57.1 | 95.2 | 60.0 | 94.7 | 59.8 | 95.5 | 60.5 |
| Distribution | $C_5^+$ | 41.3 | 21.5 | 40.1 | 21.1 | 4.8 | 8.3 | 42.6 | 21.3 | 45.7 | 24.8 |
| of Resulting | Aliphatics | | | | | | | | | | |
| Hydrocarbons | Aromatics | 15.5 | 7.0 | 14.7 | 6.6 | 43.5 | 15.7 | 15.2 | 6.8 | 14.8 | 6.7 |
| (wt. %) | | | | | | | | | | | |
| $C_5^+$ Gasoline* (wt. %) | | 56.8 | 28.5 | 54.8 | 27.7 | 48.3 | 24.0 | 57.8 | 28.1 | 60.5 | 31.5 |
| Catalyst | | 40 | | 41 | | 42 | | 43 | | 44 | |
| Support Metal | | Cu | | Cr | | Te | | Re | | Ni | |
| AlF₃ treatment | | treated | | treated | | treated | | treated | | treated | |
| Run Time (hr) | | 5.0 | 150.0 | 5.0 | 150.0 | 5.0 | 150.0 | 5.0 | 150.0 | 5.0 | 150.0 |
| Conversion (%) | | 9.13 | 71.5 | 89.6 | 70.2 | 91.1 | 72.1 | 91.7 | 71.8 | 92.5 | 72.4 |
| Distribution | $C_5^+$ | 41.5 | 34.0 | 41.2 | 34.3 | 5.5 | 7.8 | 42.2 | 35.4 | 47.8 | 40.5 |
| of Resulting | Aliphatics | | | | | | | | | | |
| Hydrocarbons | Aromatics | 16.2 | 12.2 | 15.3 | 11.5 | 45.2 | 39.7 | 15.8 | 11.9 | 15.5 | 11.6 |
| (wt. %) | | | | | | | | | | | |
| $C_5^+$ Gasoline* (wt. %) | | 57.7 | 46.2 | 56.5 | 45.8 | 50.7 | 47.5 | 58.0 | 47.3 | 63.3 | 52.1 |

*$C_5^+$ aliphatics + aromatics

Reference to Table 13 shows that the catalysts 40, 41, 42, 43 and 44 which have been treated with aluminum fluoride afford high aromatics yields and have a long life.

EXAMPLE 14

ZSM-5 having an $SiO_2/Al_2O_3$ mol ratio of 45 was prepared by a hydrothermal synthesis, calcined at 500° C. for 5 hours, then treated with 2N hydrochloric acid at 90°–100° C. for 5 hours, then washed with water thoroughly and thereafter dried at 120° C. for 5 hours to obtain a dealkalized ZSM-5. Subsequently, 3 wt. % of Zn was supported thereon by an impregnation method and further supported 0.5 wt. % Pt by an ion exchange method to obtain catalyst 45.

15 wt. % of ammonium fluoride was added and mixed to the catalyst 45 and the resultant mixture was compression-molded into 3×4 mm dia. pellets, which were then calcined at 500° C. for 8 hours to obtain catalyst 46.

Using 2.0 g. of each of the catalysts thus obtained, a life test in a reformate aromatization reaction was made under the conditions of temperature 490° C., hydrogen flow rate of 5.0 l/hr, feed rate 2.0 g/hr, WHSV=1 hr$^{-1}$, at atmospheric pressure. Results are as set forth in Table 14.

TABLE 14

| Catalyst | | Feed Reformate | Catalyst 45 (Comp. Ex.) | | Catalyst 46 (Example) | |
|---|---|---|---|---|---|---|
| Run Time (hr) | | — | 10.0 | 500.0 | 10.0 | 500.0 |
| $C_5^+$ Aliphatics Conversion (%) | | — (%) | 95.2 | 28.6 | 89.8 | 62.9 |
| Distribution | $C_1$ | 1.6 | 7.3 | 5.0 | 6.8 | 7.1 |
| of Resulting | $C_2$–$C_4$ | 15.3 | 26.8 | 18.9 | 23.9 | 18.7 |
| Hydrocarbons | $C_5^+$ | 35.3 | 1.7 | 25.2 | 3.6 | 13.1 |
| (wt. %) | Aliphatics | | | | | |
| | Aromatics | 47.8 | 64.2 | 50.9 | 65.7 | 61.1 |
| | Total | 100.0 | 100.0 | 100.0 | 100.0 | 100.0 |
| $C_5^+$ Gasoline* (wt. %) | | 83.1 | 65.9 | 76.1 | 69.3 | 74.2 |

$C_5^+$ aliphatics + aromatics

Reference to Table 14 shows that the catalyst 46 treated with ammonium fluoride affords a high aromatics yield and has a long life.

What is claimed is:

1. A process for converting hydrocarbons to aromatic hydrocarbons or gasoline having a high octane number, characterized by contacting a feed stock containing at least one aliphatic hydrocarbon having 1 to 12 carbon atoms with a catalyst at an elevated temperature, said catalyst comprising a dealkalized zeolite obtained from a zeolite having a $SiO_2/Al_2O_3$ mol ratio in the range 1 to 90 and a solid fluorine compound selected from the group consisting of aluminum fluoride, ammonium fluoride, magnesium fluoride, barium fluoride, zirconium fluoride, zinc fluoride, gallium fluoride, cadmium fluoride, nickel fluoride, chromium fluoride, tin fluoride, copper fluoride, silver fluoride, rhenium fluoride, manganese fluoride, molybdenum fluoride, selenium fluoride, tellurium fluoride, tungsten fluoride, lanthanum fluoride, cerium fluoride, titanium fluoride and calcium fluoride.

2. A process as set forth in claim 1, wherein said fluorine compound is aluminum fluoride, ammonium fluoride, magnesium fluoride or zirconium fluoride.

3. A process as set forth in claim 1, wherein said feed stock comprises one or more aliphatic hydrocarbons having 2 to 4 carbon atoms.

4. A process as set forth in claim 1, wherein said feed stock is a light straight-run naphtha distillate.

5. A process as set forth in claim 1, wherein said feed stock is a reformed naphtha distillate.

6. A process as set forth in claim 1, wherein said feed stock is a thermal-cracked gasoline.

7. A process as set forth in claim 1, wherein said contact reaction is carried out in the presence of hydrogen.

8. A process as set forth in claim 1, wherein said catalyst further contains at least one member selected from Group Ib, IIb, IIIa, VI, VIIb and VIII metals in the Periodic Table and said conversion is an aromatization reaction.

9. A process as set forth in claim 8, wherein said fluorine compound is aluminum fluoride, ammonium fluoride, magnesium fluoride or zirconium fluoride.

10. A process as set forth in claim 8, wherein said metal is at least one member selected from Cu, Ag, Zn, Cd, Ga, Cr, W, Se, Te, Re, Co, Ni, Pd, Ir and Pt.

11. A process as set forth in claim 8, wherein said feed stock comprises one or more aliphatic hydrocarbons having 2 to 4 carbon atoms.

12. A process as set forth in claim 8, wherein said feed stock is a light straight-run naphtha distillate.

13. A process as set forth in claim 8, wherein said feed stock is a reformed naphtha distillate.

14. A process as set forth in claim 8, wherein said feed stock is a thermal-cracked gasoline.

15. A process as set forth in claim 8, wherein said contact reaction is carried out in the presence of hydrogen.

16. A process as set forth in claim 1, wherein said catalyst is that obtained by dealkalizing a zeolite having a $SiO_2/Al_2O_3$ mol ratio in the range of 1 to 90, contacting the dealkalized zeolite with the fluorine compound and calcining the mixture thus obtained.

* * * * *